United States Patent [19]

Reh

[11] 3,898,524

[45] Aug. 5, 1975

[54] HORIZONTAL DEFLECTION CIRCUIT FOR TELEVISION RECEIVERS

[75] Inventor: Klaus Reh, Albershausen, Germany

[73] Assignee: International Standard Electric Corporation, New York, N.Y.

[22] Filed: Oct. 11, 1973

[21] Appl. No.: 405,381

[30] Foreign Application Priority Data

Oct. 17, 1972 Germany .......................... 2250857

[52] U.S. Cl. ................................................ 315/408

[51] Int. Cl. ............................................ H01j 29/70

[58] Field of Search .................... 315/27 TD, 28–29, 315/276 D, 22, 23, 24, 403, 408, 364

[56] References Cited

UNITED STATES PATENTS

| | | | |
|---|---|---|---|
| 3,179,843 | 4/1965 | Schwartz | 315/27 TD |
| 3,248,598 | 4/1966 | Walker | 315/27 TD |
| 3,517,250 | 6/1970 | Hirschmann | 315/27 TD |
| 3,767,960 | 10/1973 | Ahrens | 315/27 TD |

*Primary Examiner*—Maynard R. Wilbur
*Assistant Examiner*—J. M. Potenza
*Attorney, Agent, or Firm*—John T. O'Halloran; Menotti J. Lombardi, Jr.; Peter Van Der Sluys

[57] ABSTRACT

A horizontal deflection circuit for a television receiver including a deflection unit, means for controlling sweep, means for controlling commutation and means for controlling the energy applied to the horizontal final stage. Said energy controlling means includes a series connected thyristor the on time of which is variable as a function of a controlled variable developed across the deflection circuit.

10 Claims, 3 Drawing Figures

HORIZONTAL DEFLECTION CIRCUIT FOR TELEVISION RECEIVERS

BACKGROUND OF THE INVENTION

The present invention relates to a horizontal deflection circuit for television receivers which essentially comprises a unit controlling the horizontal sweep, a commutating unit, and a deflection unit.

The energy applied to such a horizontal deflection circuit must be variable, and a suitable supply circuit consists, for example, of a d.c. voltage source and a storage inductance.

Horizontal sweep or deflection circuits are known in which, for producing a periodic sawtooth current within the respective deflection coil of the picture tube, the deflection coil is connected, in a first branch circuit, via a first controlled switch, which conducts in both directions, to a sufficiently large capacitor serving as a current source, the controlled switch being formed by the inverse-parallel connection of a controled rectifier and a diode. The control electrode of the rectifier is connected to a driving-pulse source, which renders the switch conductive during part of the sawtooth sweep. The controlled rectifier is turned off by a commutation process, i.e., by a current reversal in the controlled rectifier, which is initiated by a second controlled switch.

The first controlled switch also forms part of a second branch circuit, which contains, in series with the controlled switch, a second current source and a reactance capable of oscillating. When the first switch is closed, the reactance, essentially consisting of a coil and a capacitor, receives energy from the second current source in a particular time interval. This energy, which is taken from the second current source, corresponds to the circuit losses caused during the previous deflection period.

In the above-described, known basic circuit, however, no consideration is given to the fact that it is common practice to connect the high-voltage transformer, which is necessary for the operation of the picture tube, to the horizontal final stage as well.

In such a circuit, which is largely identical to the first described circuit, the high voltage necessary to operate the picture tube is produced by stepping up the horizontal flyback pulses to the necessary voltage in a step-up transformer and applying the votage to the picture tube via a rectifier arrangement. The high-voltage transformer is connected in parallel with the deflection system. Since the energy taken from the high-voltage transformer is not constant due to the fact that it is a function of the changes in the beam current, the high voltage must be readjusted because of the finite resistance of the high-voltage source. This means that the energy applied to the horizontal final stage must be equal to the above referred to losses of the deflection circuit itself plus the energy necessary to operate the tube.

It has already been mentioned that the energy applied to the horizontal final stage is stored in a reactance. The control of the applied energy is effected by connecting a capacitor, here the flyback capacitor of the horizontal final stage, to a d.c. voltage source via an inductance inserted between the d.c. voltage source and the capacitor, with the latter being nearly at resonance with this inductance. A change in the applied energy is made by varying the inductance. This is accomplished by the parallel connection of an additional variable inductance which is represented by a transductor.

The necessary extent of the control range of such a supply circuit is substantially influenced by the variation in the voltage of the d.c. voltage source. This voltage is derived from the line voltage.

The known supply circuit has the disadvantage that the inductances, i.e., both the storage inductance and the parallel-connected transductor, must be chosen to be very large. This will become readily apparent if the extreme cases regarding the variations in supply voltage are shortly considered.

If the value of the supply voltage lies at the lower permissible limit, the inductive reactance of the transductor must be so large that the value of the overall inductance of the parallel connection is determined virtually only by the storage inductance. If, however, the value of the supply voltage lies at the upper limit, the transductor is to have the lowest possible inductive reactance, so that the value of the overall inductance of the parallel connection is determined virtually only by the transductor.

This method is unsatisfactory because of the high cost of the transductor component, and the excessive heating caused by the conversion of considerable energy.

SUMMARY OF THE INVENTION

It is the object of the present invention to provide a horizontal deflection circuit of the kind referred to which has a supply circuit which is as simple and inexpensive as possible, with the control range of the known circuit arrangement at least being preserved.

The horizontal deflection circuit according to the invention is characterized in that a controlled semiconductor switch such as a thyristor is connected into the series connection consisting of the d.c. voltage source and the storage inductance, the "on" period or conducting state of the semiconductor switch is variable as a function of a controlled variable developed across the deflection circuit.

The considerable economical advantage of this solution lies in the saving of an expensive inductive component. In addition, much less heat is developed in the storage inductance because the latter draws from the power line only so much current as is necessary to compensate for the ohmic losses.

A further embodiment of the horizontal deflection circuit according to the invention is characterized in that, for turning the television set off, the triggering of a gate electrode of the semiconductor switch is prevented.

This way of turning the television set off is of particular advantage when used in connection with cordless remote control because, in this case, it is only necessary to influence the trigger network with the gate electrode of the thyristor.

Further advantages of the invention as well as the operation of the circuit will become apparent from the following description and from the accompanying drawings.

DESCRIPTION OF THE PREFERRED EMBODIMENT

Figure 1:
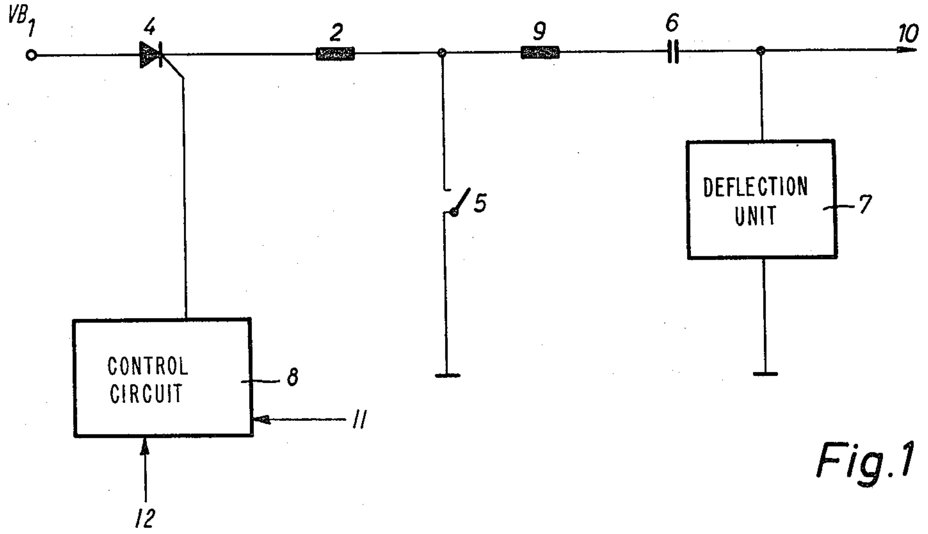
FIG. 1 shows a simplified diagram of the horizontal deflection circuit, which contains only those elements which are thought necessary for a thorough understanding of the invention, i.e., particularly the elements of the supply circuit.

Applied to the input terminal 1 is the d.c. supply voltage $U_B$, which is derived from the line voltage and may vary over a range of ± 15 percent in accordance with the line-voltage fluctuations. Connected to this input terminal 1 is the storage inductance 2. A series connection comprising the commutating coil 9, the commutating capacitor 6, and the deflection unit 7 is connected to the output of the storage inductance 2. The deflection unit 7 essentially contains the horizontal deflection coils. Connected in parallel with the above series connection is the commutator switch 5. The connection 10 is to indicate schematically that the high-voltage-generating circuit is connected to the horizontal deflection circuit also.

Connected between the input terminal 1 and the storage inductance 2 is a controlled semiconductor switch 4 whose forward direction corresponds to the direction of the supply current. Practical tests have shown that a thyristor meets the requirements imposed on the controlled semiconductor switch in a particularly favorable manner.

When the commutator switch 5 is closed and the thyristor 4 conducts, the current through the storage inductance 2 increases with a particular slope. Taking into account the other necessary and known values, a measure of the applied energy is the maximum value of the supply current through the thyristor 4 at the instant at which the commutator switch opens again.

With respect to the problem of influencing the quantity of energy it is essential that, firstly, the zero of the supply current, secondly, the instant at which the commutator switch opens, and thirdly, the slope of the current rise be fixed. Thus, only a shift of the turn-on instant comes into question for influencing the attainable maximum value of the supply current and, consequently, of the energy received from the line.

Figure 2A:
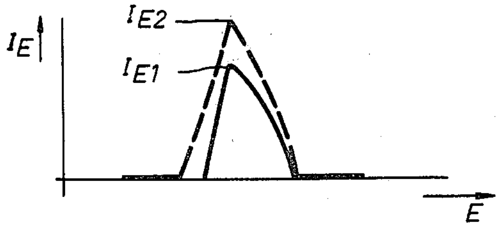
FIG. 2*a* shows the waveform of the supply current.
Figure 2B:
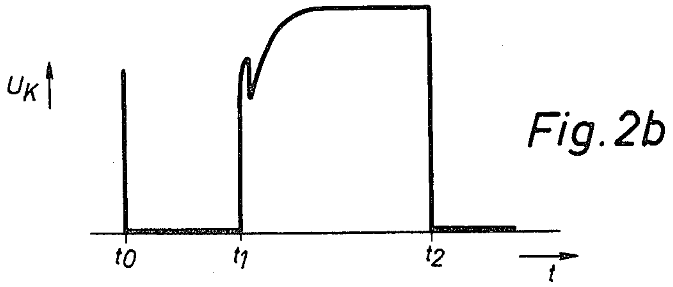
FIG. 2*b* the waveform of the commutation voltage.

A qualitative information thereon is contained in FIGS. 2*a* and 2*b*.

FIG. 2*a* shows the waveform of the supply current $I_E$ for two different turn-on instants; FIG. 2*b* shows the waveform of the commutation voltage.

In FIG. 2*b*, the time $t_1$ - $t_o$ is the time during which the commutator switch 5 is conductive, i.e., the voltage has the value "zero." At the instant $t_1$, the commutator switch 5 turns off, and the voltage $U_K$ rises as shown.

Since the feeding of energy into the storage inductance 2 takes place when the commutator switch 5 is conductive, the turning-on of the thyristor 4 must occur during the period $t_o$ - $t_1$.

As already briefly indicated and as can be seen from FIG. 2*a*, the current rise stops at the instant $t_1$, and the current reaches the value "zero" at the instant the capacitor 6 has been charged to the fixed voltage.

This is also the instant at which the thyristor 4 returns to the non-conducting state. Thus, it is apparent that the turn on instant of the thyristor determines the energy applied to the horizontal final stage.

The selection of the instant for rendering the thyristor 4 conductive again during the time $t_o$ -$t_1$ is determined by the controlled variable and is derived in a control circuit 8 from, among other things, the voltage value of the kickback pulse across the high voltage transformer (not shown) of the horizontal final stage, for example. FIG. 2*a* shows two different waveforms $I_{E1}$ and $I_{E2}$ of the supply current.

Control circuit 8 is a pulse width modulation circuit for providing a triggering pulse to the gate of thyristor 4 to turn the thyristor on. Applied to the control circuit 8, through connection 11, is the controlled variable such as the voltage value of the kickback pulse developed across the high-voltage-generating circuit. The control circuit provides a triggering pulse having a width dependent upon a comparison between the nominal and actual values of the kickback pulse.

Control circuit 8 may be any one of a number of known circuits and it will therefore not be described here in detail.

Since, in today's television sets, the horizontal final stage, which contains the deflection circuit, serves as the supply circuit for a number of other circuits, the set can be turned off by preventing triggering of the gate electrode. A control signal is provided to control circuit 8 through a connection 12 for causing the set to be turned off. The control signal functions to inhibit control circuit 8 thereby preventing the triggering pulses from reaching the gate of thyristor 4. The control signal may be initiated by any one of several conventional circuits which may be incorporated in the receiver or remotely therefrom.

What is claimed is:

1. A horizontal deflection circuit for television receivers, comprising:

- means for controlling the horizontal sweep;
- means for controlling commutation;
- a deflection unit controlled by the previously mentioned means;
- a d.c. voltage source;
- a storage inductance connected in series with the d.c. voltage source and the deflection unit, said commutation control means formed and arranged to apply d.c. energy to the storage inductance from the d.c. source during periods of commutation; and
- a controlled semiconductor switch connected in series with the d.c. voltage source and the storage inductance, the conducting period of the semiconductor switch being variable as a function of a control variable across the deflection unit.

2. A horizontal deflection unit for television receivers as described in claim 1, wherein the controlled semiconductor switch is a thyristor having a forward direction corresponding to the flow direction of the supply current, said thyristor being turned off by reversing the direction of current in the storage inductance and the conducting period of the thyristor being controlled by shifting the turn-on instant.

3. A horizontal deflection circuit for television receivers having a horizontaal final stage including a deflection unit, means for controlling a horizontal sweep, means for controlling commutation and a controllable supply circuit for controlling energy provided to the horizontal final stage, said supply circuit comprising:

a d.c. voltage source;

a storage inductance connected in series with the d.c. voltage source and the deflection unit, said commutation control means formed and arranged to apply d.c. energy to the storage inductance from the d.c. source during periods of commutation; and electronic switch means connected in series with the storage inductance and the d.c. voltage source for providing a controlled period of current flow to the storage inductance in accordance with a controlled variable developed across the deflection unit during commutation.

4. A horizontal deflection circuit as described in claim 3 wherein the electronic switch means comprises:

a semiconductor switch; and a control circuit for controlling the semiconductor switch in accordance with a controlled variable developed across the deflection unit during commutation.

5. A horizontal deflection circuit as described in claim 4 wherein the semiconductor switch comprises a thyristor having a gate connected to the control circuit for receiving a pulse signal therefrom.

6. A horizontal deflection circuit as described in claim 4 wherein the semiconductor switch is turned on during the period of commutation and is caused to turn off by the current reversal subsequent to commutation.

7. A horizontal deflection circuit as described in claim 4 wherein the control variable is a horizontal kickback pulse.

8. A horizontal deflection circuit as described in claim 4 wherein the control circuit is a pulse width modulator for providing a pulse having a width corresponding to the controlled variable.

9. A horizontal deflection circuit for television receivers, comprising:

a horizontal final stage including a deflection unit;

a d.c. energy source; and electronic switch means connected in series with the energy source and the horizontal final stage for providing a controlled period of current flow to the horizontal final stage in accordance with a controlled variable developed across the deflection unit.

10. A horizontal deflection circuit as described in claim 9, additionally comprising means for maintaining the electronic switch means in an off condition whereby the television receiver is turned off.

* * * * *